Figure 1:
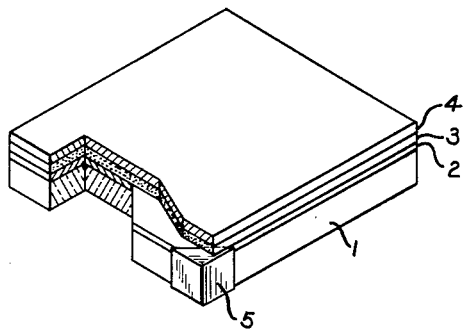

June 6, 1961   H. C. FROELICH   2,987,485
ELECTROLUMINESCENT PHOSPHOR
Filed Jan. 17, 1955

Inventor:
Herman C. Froelich,
by *Vernet C. Kauffman*
His Attorney

United States Patent Office 2,987,485
Patented June 6, 1961

2,987,485
ELECTROLUMINESCENT PHOSPHOR
Herman C. Froelich, Cleveland Heights, Ohio, assignor to General Electric Company, a corporation of New York
Filed Jan. 17, 1955, Ser. No. 481,991
12 Claims. (Cl. 252—301.6)

My invention relates to luminescent materials or phosphors and more particularly to field responsive, electroluminescent phosphors, that is, phosphors which emit visible radiation under A.C. field excitation.

Blue emitting electroluminescent phosphors as previously known have been prepared from copper activated zinc sulfide or from mixtures of zinc sulfide and zinc oxide with a small amount of copper activator. These phosphors have been prepared with and without certain fluxes and with or without special firing atmospheres, such as hydrogen sulfide. The brightness of the known phosphors has been relatively low and, as in fluorescent lamps in which the phosphors are excited to luninescence by short wave radiation of a low-pressure mercury vapor discharge, the quantity of visible light emitted per unit of electric energy consumed tends to fall with continued use of the lamp or electroluminescent cell. In most cases a substantial loss is suffered early in life and the loss increases more slowly thereafter as the life expectancy of the lamp or cell is approached. These losses in the light output during the life of the lamp or electroluminescent cell are characterized as the maintenance of the device. Electroluminescent cells incorporating the known, field responsive phosphors have not exhibited good maintenance characteristics.

It is, therefore, one object of my invention to provide a zinc sulfide-zinc oxide phosphor of improved brightness and maintainence under A.C. field excitation.

Another object is to provide a field responsive zinc sulfide-zinc oxide phosphor capable of either green or dark blue emission.

In accordance with one aspect of my invention, I have discovered that the electroluminescent brightness of these phosphors can be doubled if a small amount of silver is introduced into the phosphor as an activator in conjunction with the copper. In addition I have discovered that the firing temperature of the materials controls the color of the emission. For example, the copper and silver activated phosphor of my invention when fired at a temperature above 1020° C. up to about 1200° C. produces a deep or dark blue emission. At firing temperatures below 1020° C. down to about 800° C. a green emitting phosphor is produced. In the case of the blue emitting phosphor, the spectral emission is slightly broadened or its peak is shifted somewhat toward longer wavelengths compared with the emission of phosphors containing copper activator alone due to the appearance of the green copper band. This spectral shift holds true for low frequency (60 cycles per second) field excitation. At higher frequencies such as 5000 cycles per second field excitation the colors become more nearly comparable. Both the blue and the green emitting phosphors activated in addition with silver give superior maintainence to phosphors activated with copper alone and perform equally well under field excitation of high, intermediate and low frequency.

In the drawings, FIG. 1 is a pictorial view of one form of an electroluminescent device embodying my invention.

Figure 2:
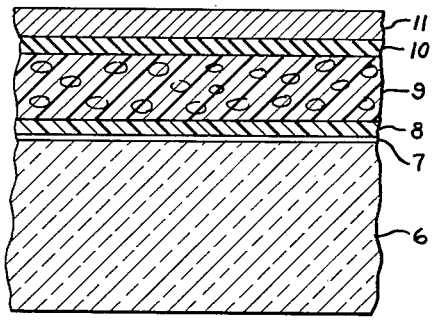
Figure 3:
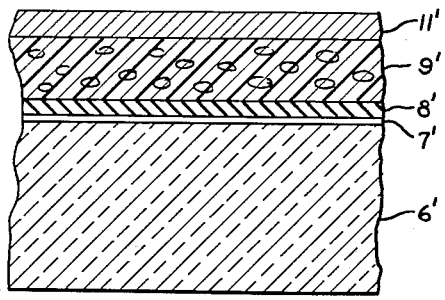

FIGS. 2 and 3 are cross-sectional views showing some modifications of the possible arrangements of the sandwiched layers in electroluminescent devices.

Electroluminescent lamps generally comprise a phosphor dispersed in a dielectric medium sandwiched between two conductive plates or surfaces between which a voltage is applied to exicte the phosphor. In order for the device to emit useful light, at least one of the conductive plates must be transparent or at least light-transmitting, and the materially generally used for this plate is so-called conducting glass. The other conductive plate may take the form of a backing layer, preferably one that is light-reflecting, although a light transmitting conductive backing may be used if it is desired that the lamp radiate light in both directions.

The dielectric throughout which the phosphor is dispersed is preferably one having a high dielectric constant. It may also be desirable to interpose an insulating layer between the phosphor dielectric layer and one or both of the conducting plates or surface. A suitable insulating layer for this purpose may consist, for instance, of a nitrocellulose film of uniform thickness deposited over the conductive layer on the glass plate, in which case the phosphor may be dispersed in a film of methyl cellulose or polystyrene.

For further details of construction of electroluminescent lamps reference may be had to application No. 347,575—Jaffe, filed April 8, 1953, assigned to the assignee of the present application, now Patent 2,774,004.

Referring to the drawings, FIG. 1 shows the construction of a simple luminescent panel in which a glass plate 1 is provided with a conductive surface or coating 2 over which is applied the phosphor or luminescent material 3 dispersed in a dielectric medium and covered with a conductor 4 which may be a metal sheet, for example, or a light-transmitting conductor. A voltage is applied between the metal tab 5 and the conducting plate 4 to create an electric field and thereby excite the phosphor 3 to luminescence.

FIG. 2 shows a different arrangement of the sandwiched layers in an electroluminescent lamp in which the glass 6 is provided with the usual conductive surface 7 over which is applied an insulating layer 8, usually of nitrocellulose, on top of which is applied the phosphor in a dielectric electric medium 9 followed by another insulator coating 10 over which is applied the usual conductive member or coating 11.

In FIG. 3 the same general construction is shown. However, the insulating coating 10 (FIG. 2) between the upper conductor 11 and the phosphor is eliminated.

Referring particularly to the phosphor, by way of specific example, a typical phosphor batch according to one aspect of my invention is prepared as follows: 600 grams of the purest, precipitated zinc sulfide and 200 grams of the purest zinc oxide are made into a paste with water. To this is added a solution of 0.4 gram of copper as copper nitrate and 0.08 gram of silver as silver nitrate in about 100 cc. of water. The mixture is stirred until it is of uniform, light gray color. It is then dried at about 150° C., sieved through a fine screen, and loaded into the firing vessel. The firing vessel should permit the firing of the powder without too much free access of air.

A convenient firing vessel consists of a silica tube, closed at one end, which can be telescoped into a similar tube of slightly larger diameter so that the open end of the inner tube touches the bottom of the outer tube. The annular space between the tubes may be filled with zinc sulfide or zinc oxide to further reduce air circulation.

The tubes are placed in a cold furnace which is then brought up to 1040° C. The charge is maintained at this temperature for 15 to 20 hours, after which time it is removed while hot and allowed to cool. The phosphor portion is then screened and stirred into a cold solution of 500 cc. of glacial acetic acid in 2000 cc. of water. After three hours of stirring the mixture is heated to boiling and soon thereafter filtered while hot. The residue is washed with cold, dilute, acetic acid followed by water.

The filter cake is then reslurried in 1000 cc. of lukewarm water, treated with a solution of 25 grams of sodium cyanide in water and stirred for one-half hour. It is then filtered, washed thoroughly, dried and finally screened through a 200 mesh screen.

The phosphor so prepared is characterized by a dark blue emission (fired above 1020° C.) and when incorporated in an electroluminescent cell operated at 240 volts, 60 cycles, gave a brightness reading of 25 on an arbitrary scale. A similar phosphor activated with copper and without any silver addition, gave a brightness reading of 11 on the same scale. Similar results were achieved with the green modification of the same phosphor which was fired at a temperature of 900° C.

In addition to the more than two-fold increase in brightness of both the blue and green modifications of the phosphor, considerable improvement in maintenance was also noted in phosphors of both colors. For example, after 1800 hours of operation an electroluminescent lamp incorporating the double activated phosphor prepared as described above shows a reduction in radiant flux output expressed in terms of lumens per watt of one-half to one-fifth the reduction shown by a lamp incorporating the same basic phosphor activated by copper alone after the same period of operation. In other words, the copper and silver activated phosphor possesses maintenance characteristics at least twice and as much as five times as good as the phosphor activated with copper alone.

Good results have been achieved using activator concentrations ranging from 0.005% to 0.5% by weight copper and from 0.002% to 0.1% by weight silver. Optimum brightness of the phosphor was achieved using activators in the proportions of 0.05% by weight copper and 0.01% by weight silver based on the combined weight of the base raw material and when the base raw materials were used in the ratio of 75% by weight zinc sulfide and 25% by weight zinc oxide. The matrix or raw materials may be combined in proportions covering a fairly wide range without any significant change in the results. For example, matrix ratios from 95% zinc sulfide and 5% zinc oxide to 50% zinc sulfide and 50% zinc oxide or beyond will result in acceptable phosphors.

Firing temperatures for the blue modification of the phosphor were varied from 1020° C. to 1200° C. At the higher temperatures, the brightness generally declined and the particle size increased and consequently 1040° C. was found to be the optimum firing temperature for the blue emitting phosphor. Similarly, the green emitting phosphor was fired at temperatures ranging from 800° C. to 1020 C. and the optimum temperature was found to be about 900° C.

As previously indicated, the main difference in preparation between the blue and the green emitting phosphors lies in the firing temperature. The blue phosphor is more readily formed at firing temperatures higher than 1020° C. and the green phosphor at temperatures below 1020° C. While 1020° C. also happens to be the inversion temperature of cubic to hexagonal zinc sulfide, it cannot be said that it is this crystal modification alone which determines the color of emission.

It will be noted that although the phosphor batch is prepared with certain percentages of activator and matrix ingredients, the final phosphor may contain different amounts. This is due to the removal of free metal sulfides during the treatments with acetic acid and cyanide and to the removal of most if not all of the zinc oxide during the same steps. Zinc oxide is slightly soluble in zinc sulfide and it is, therefore, possible to have a small amount of zinc oxide in solid solution in the zinc sulfide which is not affected by the acetic acid or cyanide treatment.

From the example given, it is apparent that special firing atmospheres, such as hydrogen sulfide, or evacuated firing chambers are not necessary to produce the improved phosphor of my invention. Limiting the free access of air during firing as in a closed or covered vessel or the telescoped tubes described above is sufficient.

Although a preferred embodiment of my invention has been disclosed, it is recognized that variations and changes may be made therein within the spirit and scope of the invention as defined by the appended claims. It is understood particularly that the ratios of activators, the firing temperatures, as well as matrix ingredients can be varied independently and in relation to each other within fairly wide limits to obtain the desired result.

What I claim as new and desire to secure by Letters Patent of the United States is:

1. A copper and silver activated zinc sulfide-zinc oxide, electro-luminescent field responsive, phosphor produced by firing a mixture of from about 95% to 50% by weight zinc sulfide and from about 5% to 50% by weight zinc oxide, about 0.005% to about 0.5% by weight copper, and about 0.002% to 0.1% by weight silver at a temperature of about 800° C. to 1200° C. in a closed vessel.

2. A copper and silver activated zinc sulfide-zinc oxide, electro-luminescent field responsive, phosphor characterized by dark blue emission induced by firing a mixture of from about 95% to 50% by weight zinc sulfide and from about 5% to 50% by weight zinc oxide, about 0.005% to about 0.5% by weight copper, and about 0.002% to 0.1% by weight silver at a temperature of about 1020° C. to about 1200° C. in a closed vessel.

3. A copper and silver activated zinc sulfide-zinc oxide, electro-luminescent field responsive, phosphor characterized by dark blue emission induced by firing a mixture of from about 95% to 50% by weight zinc sulfide and from about 5% to 50% by weight zinc oxide, about 0.05% by weight copper and about 0.01% by weight silver based on the total weight of matrix ingredients, at a temperature of about 1040° C. in a closed vessel.

4. A copper and silver activated zinc sulfide-zinc oxide, electro-luminescent field responsive phosphor characterized by dark blue emission induced by firing a mixture of about 75% by weight zinc sulfide and about 25% by weight zinc oxide, about 0.05% by weight copper and about 0.01% by weight silver based on the weight of matrix ingredients at a temperature of about 1040° C. in a closed vessel.

5. A copper and silver activated zinc sulfide-zinc oxide, electro-luminescent field responsive, phosphor characterized by green emission induced by firing a mixture of from about 95% to 50% by weight zinc sulfide and from about 5% to 50% by weight zinc oxide, about 0.005% to about 0.5% by weight copper and about 0.002% to 0.1% by weight silver at a temperature of about 800° C. to about 1000° C. in a closed vessel.

6. A copper and silver activated zinc sulfide-zinc oxide, electro-luminescent field responsive, phosphor characterized by green emission induced by firing a mixture of from about 95% to 50% by weight zinc sulfide and from about 5% to 50% by weight zinc oxide, about 0.05% by weight copper and about 0.01% by weight silver based on the weight of matrix ingredients at a temperature of about 900° C. in a closed vessel.

7. A copper and silver activated zinc sulfide-zinc oxide, electro-luminescent field responsive, phosphor characterized by green emission induced by firing a mixture of about 75% by weight zinc sulfide and about 25% by weight zinc oxide, about 0.05% by weight copper and about 0.01% by weight silver at a temperature of about 900° C. in a closed vessel.

8. The method of preparing a copper and silver activated zinc sulfide-zinc oxide, electro-luminescent field responsive phosphor which comprises firing about 95% to 50% by weight zinc sulfide and about 5% to 50% by weight zinc oxide in admixture with about 0.005% to 0.5% by weight copper and about 0.002% to about 0.1% by weight silver at a temperature of about 800° C. to about 1200° C. in a closed vessel.

9. The method of preparing a copper and silver activated zinc sulfide-zinc oxide, electro-luminescent field responsive phosphor having a dark blue emission which comprises firing about 95% to 50% by weight zinc sulfide and about 5% to 50% by weight zinc oxide in admixture with about 0.005% to 0.5% by weight copper and about 0.002% to about 0.1% by weight silver at a temperature of approximately 1040° C. in a closed vessel.

10. The method of preparing a copper and silver activated zinc sulfide-zinc oxide, electro-luminescent field responsive phosphor having a dark blue emission which method comprises firing about 75% by weight zinc sulfide and about 25% by weight zinc oxide in admixture with about 0.05% by weight copper and about .01% by weight silver at about 1040° C. in a closed vessel, and then boiling the fired reaction products in acetic acid.

11. The method of preparing a copper and silver activated zinc sulfide-zinc oxide, electro-luminescent field responsive phosphor having a green emission which method comprises firing from about 95% to 50% by weight zinc sulfide and about 5% to 50% by weight zinc oxide in admixture with about 0.005% to about 0.5% by weight copper and about 0.002% to about 0.1% by weight silver at a temperature of about 800° C. to about 1000° C. in a closed vessel.

12. The method of preparing a copper and silver activated zinc sulfide-zinc oxide, electro-luminescent field responsive phosphor having a green emission which method comprises firing about 75% by weight zinc sulfide and about 25% by weight zinc oxide in admixture with about 0.05% by weight copper and about 0.01% by weight silver at about 900° C. in a closed vessel.

References Cited in the file of this patent

UNITED STATES PATENTS

| | | |
|---|---|---|
| 2,474,506 | Wood | June 28, 1949 |
| 2,660,566 | Froelich | Nov. 24, 1953 |
| 2,698,915 | Piper | Jan. 4, 1955 |
| 2,743,237 | Froelich | Apr. 24, 1956 |
| 2,743,238 | Hunt | Apr. 24, 1956 |
| 2,780,731 | Miller | Feb. 5, 1957 |
| 2,782,168 | Fetters | Feb. 19, 1957 |

OTHER REFERENCES

Destriau: Phil. Mag., vol. 38, October 1947, page 710.